May 12, 1970             R. HALLER            3,512,006
AUTOMATIC RECORDERS FOR PRECISION GONIOMETERS OR LENGTH
MEASURING INSTRUMENTS EMPLOYING COARSE AND FINE SCALES
Filed July 24, 1967                              2 Sheets-Sheet 1

INVENTOR.
Rudolf Haller
BY Alvin Browdy
Attorney

May 12, 1970              R. HALLER            3,512,006
AUTOMATIC RECORDERS FOR PRECISION GONIOMETERS OR LENGTH
MEASURING INSTRUMENTS EMPLOYING COARSE AND FINE SCALES
Filed July 24, 1967                            2 Sheets-Sheet 2
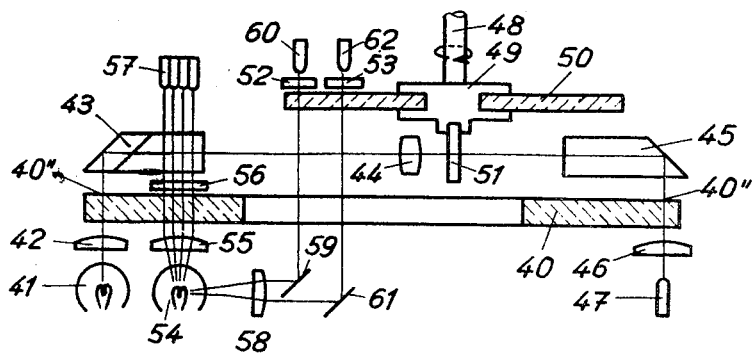
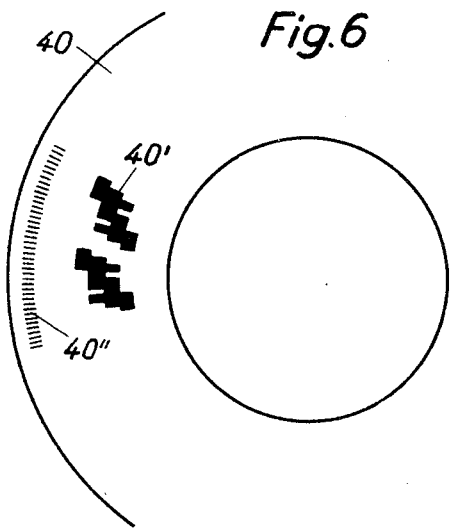
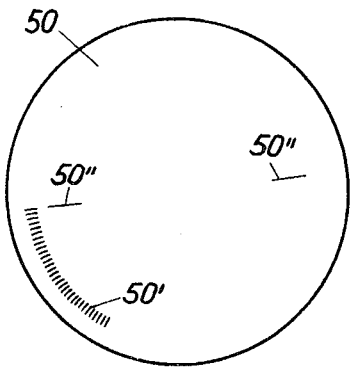
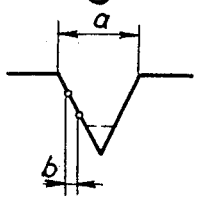
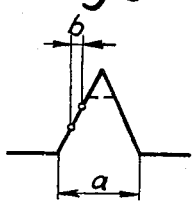
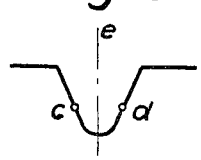
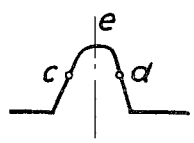
INVENTOR.
Rudolf Haller
BY Alvin Browdy
attorney ¹ United States Patent Office 3,512,006
Patented May 12, 1970

3,512,006
AUTOMATIC RECORDERS FOR PRECISION GONIOMETERS OR LENGTH MEASURING INSTRUMENTS EMPLOYING COARSE AND FINE SCALES
Rudolf Haller, Kolliken, Switzerland, assignor to Kern and Company, A.G., Aarau, Switzerland, a corporation of Switzerland
Filed July 24, 1967, Ser. No. 655,441
Claims priority, application Switzerland, July 23, 1966, 10,752/66
Int. Cl. G01d 5/36
U.S. Cl. 250—231        7 Claims

ABSTRACT OF THE DISCLOSURE

In automatic recorder measuring instruments having an index, and finely and coarsely divided scales, an imaging system for imaging the index on the finely divided scale, rotatable image-shifting plane parallel plate mechanically connected to a rotatable coded scale, and photocells responsive to the light from the image and through the coded scale for controlling the recorder.

BACKGROUND OF THE INVENTION

The invention relates to two embodiments of a novel automatic recorder for precision goniometers and length measuring instruments.

Automatic high-precision recording measuring instruments, operating at a remarkably high speed, are known in the prior art. In these known instruments the scales or graduated circles incorporate a very precise and expensive coded graduation. To record the measured value, and perhaps also to evaluate it, highly complicated and very expensive recorders and evaluators are necessary. Automatic recording precision measuring instruments of this kind are essential where measured values must be recorded continuously and very quickly. In many applications, however, where it would be highly desirable to record measured values automatically, but where the far slower non-automatic recording can be accepted, as in geodetic angular and length measurements, the known automatic precision recording instruments are far too expensive.

SUMMARY OF THE INVENTION

The invention renders possible a recorder which, operating at a somewhat reduced speed, automatically records angular and length measurements with the highest possible accuracy, using appreciably less complex apparatus.

BRIEF DESCRIPTION OF THE DRAWING

The invention will now be described in detail, with reference to the annexed drawings, wherein:
FIG. 5 is a vertical projection of a second form of the invention;
FIG. 6 is a top view of the graduated circle employed with the second embodiment;
FIG. 7 is a top view of the micrometer disc used with the second embodiment;
and
FIGS. 8, 9, 10, 11 graphically show the change in current of a photocell that controls operation of the recorder.

DESCRIPTION OF THE PREFERRED EMBODIMENTS

Figure 1:
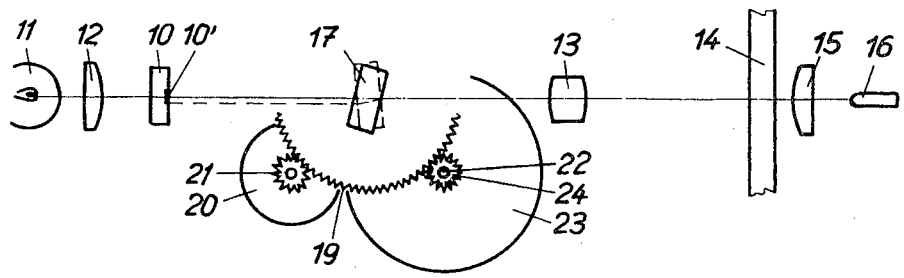
FIG. 1 is a vertical projection of a first embodiment of the invention.
Figure 2:
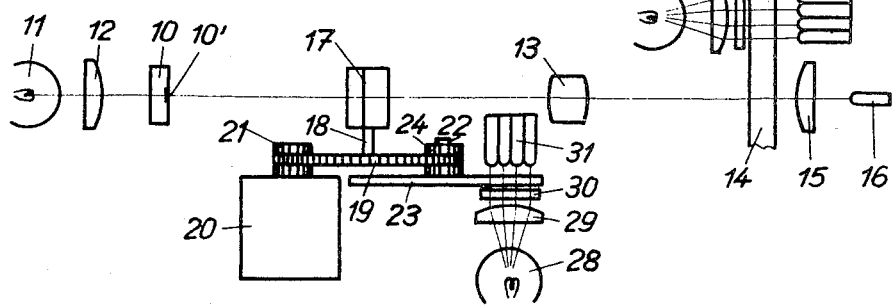
FIG. 2 is a top view of FIG. 1.
Figure 4:
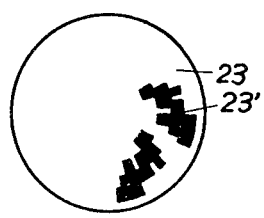
FIG. 4 is a top view of the micrometer disc.

With reference to FIGS. 1 and 2, the automatic recorder for a precision goniometer comprises a stationary graduated plate 10 serving as an index, the plate 10 being illuminated by a light source 11 through a condensing lens 12 and imaged by an objective lens 13 on the glass graduated circle 14 of the goniometer.

A condenser lens 15 located downstream of the graduated circle 14 converges the light beam on a photocell 16. A plane parallel plate 17, mounted between the plate 10 and the objective lens 13 on a shaft 18 of the goniometer, acts as an optical micrometer. The shaft, and thus the plane parallel plate, can be turned by means of a gear wheel 19, connected to the shaft 18, and a pinion 21 connected to the shaft butt of a small motor 20. The goniometer further includes a shaft 22, parallel to the shaft 18, that supports a glass disc 23 which is divided into micrometer graduations. The shaft 18, and thus the micrometer disc 23, is turned via the gear 19 meshing with a pinion 24 mounted on the shaft 22.

Figure 3:
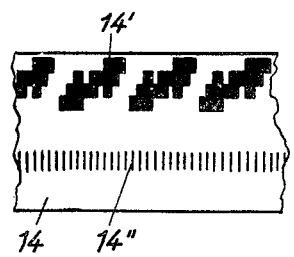
FIG. 3 shows a portion of the graduated circle, shown as a straight strip to preserve the simplicity of the figure.

With reference to FIG. 3, the graduated circle 14, illustrated as a straight strip for the sake of simplicity, carries a coarse coded scale 14', which may be of any customary form and serves as the coarse graduations, and uniform line graduations 14" serving as the fine graduations, the spacing of which corresponds, as a rule, to the smallest unit of the coarse coded scale 14'. The objective lens 13 and the spacing between the graduated plate 10 and the objective lens 13, on the one hand, and between the objective lens 13 and the graduated circle 14, on the other hand, are so chosen that the separation between the adjacent line graduations 10' of the plate 10 imaged on the circle 14 corresponds precisely to the separation between adjacent line graduations 14" of the circle 14. The line graduations 14" can be positive or negative: that is, opaque lines on a transparent background or transparent lines on a opaque background. If the lines 14" are positive, the lines 10' must be negative. If, however, the lines 14" are negative, the lines 10" can be positive or negative. The micrometer disc 23 incorporates a series of graduations 23' that can take the form of coded graduations.

A part of the coarse code 14' is illuminated via a light source 32 and a condenser lens 25. On the opposite side of the graduated circle 14 is located a group of photocells 26, the photocells receiving light in dependence on whether or not the illuminated portion of the graduations has a transparent zone. A slit stop 27, located immediately in front of the graduated circle 14, permits only a radially extending light beam to fall on the graduations 14'.

A portion of the micrometer disc 23 is illuminated by means of a light source 28, condenser lens 29, and a slit stop 30 corresponding to the stop 27. A group of photocells 31 is located on the opposite side of the disc 23. These photocells receive light in dependence on whether or not the illuminated portion of the graduation 23' has a transparent zone.

The improvements in the automatic recorder described also include an electrical recording apparatus (not shown), of any suitable and known kind, which receives the pulses from the phototubes and stores them or immediately records them on a suitable medium, such as punched tape, punched card, or magnetic tape. The recorder further includes a control arrangement (not shown), of any suitable and known kind, controlling operation of the motor 20 and the entire recording operation.

After the graduated circle 14 has been placed in a recording position, the recorder records a measured value in the following manner.

The aforesaid control arrangement operates the motor 20, whereby the plane parallel plate 17 and the micrometer disc 23 are returned to their starting positions, as shown in FIG. 1, after each recording. If by operating the switch of the control arrangement a recording operation is begun, the motor 20 starts to turn the plane parallel plate 17 and the micrometer disc 23. As a result, the image of the line graduations 10' is shifted with respect to the line graduations 14" so that, in some position of the plane parallel plate 17, between its starting position and its end position shown in dash line in FIG. 1, it is brought either into coincidence with the graduations 14" or into a predetermined relative position with respect thereto. At this moment the photocell 16, which serves as the control signal source, provides, in conjunction with the photocells 31, the recorder with the signal to record the position of the micrometer disc 23. Simultaneously, or at another moment during the recording operation, the photocells 26 are operated to record the coarse coded scale 14' of the graduated circle 14. Thus, the coarse and precise values are recorded on the medium, and the recording operation is finished. The plane parallel plate 17 and the micrometer disc 23 are then immediately turned back to their starting positions. The gear ratio between gear 19 and pinion 24 is so chosen that one revolution of the micrometer disc 23 corresponds to the measuring range of the plane parallel plate 17.

The above-described recorder is particularly suitable for geodetic goniometers, since every 2000 units of the coarse measurement and of the precise measurement enables recording of one one-hundreth of a second.

The positions of the light source 11 and of the photocell 16 can be interchanged without altering the operation of the invention. If desired, the plane parallel plate 17 can be located between the objective lens 13 and the graduated circle 14, by a suitable choice of the magnification of the objective lens 13 and of the separation between the objective lens 13 and the plate 10 and graduated circle 14. Instead of the plane parallel plate 17 there can serve as the optical micrometer a glass cube, a glass polygonal prism, a glass sliding wedge, or some other optical component that lends itself for use as an optical micrometer.

The automatic recorder can also be employed in instruments for measuring lengths.

With reference to FIG. 5, the partly illustrated embodiment operates fundamentally in the same manner as the automatic recorder of FIGS. 1 to 4 and is intended for a goniometer in which the angular value is recorded using two diametrically opposite positions to eliminate the angular error caused by an eccentric circular scale. In this embodiment the graduated circle of the goniometer (not further illustrated) is given the reference number 40. As shown in FIG. 6, the graduated circle incorporates coarse graduations in the form of a coarse coded scale 40' and line graduations 40", which latter take the place of the line graduations 10' on plate 10 of the previous embodiment. A light source 41, condenser lens 42, prism 43, objective lens 44, and second prism 45 image a portion of the graduations 40" on the oppositely located portion of the graduations 40". The imaging system (43, 44, 45) is so designed that when the graduated circle is rotated the image of the graduations 40" of the left hand portion (with reference to FIG. 5) of the circle 40 moves in the opposite direction with respect to the graduations on which they are imaged. To this end, prism 43 is a roof prism. The light passing through the right hand portion of the circle 40 is converged by a lens 46 and falls on a photocell 47. In this embodiment as in the previous, the positions of the light source 41 and of the photocell 47 can be interchanged without affecting the operation of the invention. If, as shown, the circle 40 has a single series of graduations 40", the latter must be negative: that is, transparent lines on an opaque background. However, two concentric series of graduations 40" on the circle 40, or two concentric circles, each with a single series of graduations 40", can be provided. In this event, both series can be negative or one negative and the other positive.

A shaft 48, driven by a small motor (not shown) operated by a control arrangement (not shown), as in the previous embodiment, is rotatably mounted in the goniometer. A hub 49 on the shaft 48 carries a finely graduated glass circle that serves as the micrometer disc 50. The hub also mounts a plane parallel plate 51, located in the light path of the imaging system 43, 44, 45, and that acts as an optical micrometer. As shown in FIG. 7, the micrometer disc 50 is provided with very fine graduations 50' which, for example, may have a separation of 0.01 mm., and with at least one line 50" located on another radius. The graduations 50' and line(s) 50" can be positive or negative. A plate 52, located immediately adjacent and on the radius of the graduations 50', has graduations 52' which are negative when 50' are positive, or vice versa. A stationary opaque plate 53 having a light slit is located immediately adjacent the disc 50 at the radius of the line 50". Of course, if the one or more lines 50" are transparent on an opaque background, the slit on plate 53 can be replaced by a line on a transparent background. The position of the line(s) 50" on the micrometer disc 50 must be such that they coincide with the slit of plate 53 when the plane parallel plate 51 is in its starting position. If the plane parallel plate is to be used in two different positions separated by 180°, the micrometer disc 50 must incorporate two diametrically opposite lines 50". As in the previous embodiment, the plane parallel plate can be replaced by a glass cube or by a regular glass prism, in which case the micrometer disc 50 must incorporate four or more spaced lines 50".

A light source 54 and a condenser lens 55 illuminate a portion of the coarse coded scale 40' of the graduated circle 40. The light passes through a slit stop 56 and is incident on a group of photocells 57. A part of the light from source 54 also passes through graduated plate 52 onto a photocell 60 after being reflected by the mirror 59. Another part of the light is reflected by a mirror 61, illuminates a part of the disc 50 at the radius of the line(s) 50", passes through the plate 53, and falls on a photocell 62.

The measuring and recording operation of the embodiment of FIG. 5 differs from that of the previous embodiment solely in that for precise measurement the position of the micrometer disc 50 is not held fixed. Instead, when a recording is begun the plane parallel plate 51 and the micrometer disc 50 start to rotate, and the precise measurement is accomplished by counting off the spaces between the graduations 50'. Once the recording operation has begun, as soon as a line 50" of the disc 50 coincides with the slit of plate 53, the photocell 62 sends a pulse to the recorder (not shown), which pulse starts the counting operation. The number of pulses sent from the photocell 60 to the recorder represents the precision measurement. The pulses from the photocell 60 continue to be counted until the recorder receives a pulse from photocell 47, which pulse stops the counting.

This construction of the automatic recorder enables, with a goniometer having a graduated circle 40 with a coarse coded scale 40' of 1000 units and also having a micrometer disc 50 incorporating a series of 2000 graduations 50' (corresponding to 4000 pulses) distributed over the angle that corresponds to the measuring range of the plane parallel plate 51, the direct recording of one one-hundredth of a second.

If the measured values of both the horizontal and vertical circles of a theodolite are to be recorded, the obtained values, after suitable transposition, can be successively recorded and stored by the same recorder.

Since the parallel shifting caused by the plane parallel plate 17 or 51 is not precisely linear with respect to the angle of rotation, it may be necessary that the coded scale 23' or graduations 50' be laid off in a suitably non-linear manner. Correction can also be had by so designing the imaging system that the non-linearity due to the plane parallel plate 17 or 51 is corrected.

Quite obviously, the maximum obtainable measuring and recording precision of the two recorder embodiments is dependent on the exactness, or with what degree of deviation, the photocells 16 or 47 send a pulse to the recorder for starting the recording of the precision measurement. Depending on whether the graduations are positive or negative, the photocell 16 or 47 is continuously illuminated, the intensity of the illumination falling towards zero when a graduation and index (10' or 40") overlap and afterwards rising to its original value; or, when both graduations are negative, the photocell is not illuminated, so that when two graduations overlap the photocell produces a photocurrent, which increases from the moment the overlapping begins until it reaches a maximum, whereupon it falls until it is again zero. FIGS. 8 and 9 show the change in photocurrent, wherein the variation after the dash line arises when the graduation widths are not equal. In FIGS. 8 and 9 $a$ indicates the width of the graduation and $b$ the assumed deviation of the switching point of the photocell. Greater precision can be obtained by so designing the photocell and its associated circuitry that a definite current is obtained at the moment of either falling below or exceeding. From these two currents the average can be obtained. This can be seen from FIGS. 10 and 11, wherein $c$ and $d$ indicate the switching point of the photocell and $e$ the average value, that is, the middle of the graduation.

If for any desirable reason, the light source slit stops, and photocells can be remotely located from the measuring instrument, by providing a suitable imaging system.

I claim:

1. In an automatic recorder for precision goniometers or length measuring instruments having a coarse measurement employing a coded graduation and a fine measurement employing a simple line graduation, the improvement comprising:
   first index means comprising a fixed plate having a graduation;
   second means in optical alignment with said first index means and having finely divided graduations thereon;
   imaging means defining an optical path for imaging the graduation of said first index means on a part of the graduations of said second means;
   a light source for said imaging means;
   a photocell located in the optical path downstream from the imaging on said second means, said photocell controlling a recorder;
   optical micrometer means located in said optical path for parallel shifting of the position of the image at least one graduation division;
   third means having finely divided graduations and serving as a micrometer element, said third means and optical micrometer means being mechanically coupled so that a given relative position between the graduations of said second means and the image of the graduations corresponds to a definite position of said third means;
   fine scale measuring means for determining the position of graduations on said third means for causing the recorder, upon receiving a signal from said photocell, to indicate the position of the second and third means and to store the resulting value of the measurement, said fine scale means including electro-optical elements; and
   coarse scale measuring means for measuring graduations on said second means.

2. In an automatic recorder for precision goniometers or length measuring instruments having a coarse measurement employing a coded graduation and a fine measurement employing a simple line graduation, the improvement comprising:
   a circular plate having graduations thereon, one side of which serves as a first indexing means and the other side of which serves as a second means;
   imaging means defining an optical path for imaging the graduations of said first means on a part of the graduations of said second means;
   a light source for said imaging means;
   a photocell located in the optical path downstream of said imaging of the graduations of said first means on said second means, for controlling a recorder;
   optical micrometer means located in said optical path, for parallel shifting the position of the image at least one graduation division;
   third means having finely divided graduations and serving as a micrometer element, said third means and optical micrometer means being mechanically coupled so that a given relative position between the graduations of said second means and the image of the graduations corresponds to a definite position of said third means;
   fine scale measuring means for determining the position of graduations on said third means for causing the recorder, upon receiving a signal from said photocell, to indicate the position of the second and third means and to store the resulting value of the measurement, said fine scale means including electro-optical elements; and
   coarse scale measuring means for measuring graduations on said second means.

3. The improvement as defined in claim 2 wherein said circular plate has coarse coded graduations and at least one series of line graduations (40"), one part of said line graduations serving as said index and being imaged, through said optical micrometer means (51), by said imaging means (43, 44, 45) on a diametrically opposite series of line graduations said graduated circle; a rotatable shaft (48) mounting said optical micrometer means and said third means for rotation, said third means incorporating circularly extending finely divided graduations (50') located at a first radius and at least one positive or negative line (50") located at a second radius; a second light source (54) for illuminating said line; a stationary plate (53) located at said second radius and having a slit or a line; a second photocell (62) located downstream of said plate and third means, for receiving light from said second light source for causing, when said line of said third means coincides with said slit or line of said plate, the recorder to begin counting and recording the spaces between the circularly extending graduations, until said photocell (47) controls the recorder to stop counting when the imaged lines of said one part of said said line graduation coincides with the diametrically opposite part of said line graduation.

4. The improvement as defined in claim 3, wherein said graduated circle has a single series of line graduations, whereby said one series and said diametrically opposite series of line graduations are identical.

5. The improvement as defined in claim 1, wherein said graduations of said third means are non linear, for compensating for the non linearity between the image shift and the angular movement of said optical micrometer means.

6. The improvement as defined in claim 1, wherein said imaging system compensates for the non linearity between the image shift and the angular movement of said optical micrometer means.

7. The improvement as defined in claim 1, including circuitry for said photocell whereby at the moment of falling below or exceeding a definite current pulse is supplied by the photocell, and further including means associated with the recorder for forming and recording the average of the two pulses.

References Cited

UNITED STATES PATENTS 2,870,671  1/1959  Falconi _____ 250—236
2,993,200  7/1961  Walker et al.

RALPH G. NILSON, Primary Examiner

M. ABRAMSON, Assistant Examiner

U.S. Cl. X.R.

250—233